(12) United States Patent
Han et al.

(10) Patent No.: US 9,679,484 B2
(45) Date of Patent: Jun. 13, 2017

(54) APPARATUS AND METHOD FOR DETECTING NEARBY VEHICLES THROUGH INTER-VEHICLE COMMUNICATION

(71) Applicant: KYUNGPOOK NATIONAL UNIVERSITY INDUSTRY-ACADEMIC COOPERATION FOUNDATION, Daegu (KR)

(72) Inventors: Dong Seog Han, Daegu (KR); Soon Ki Jung, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 85 days.

(21) Appl. No.: 14/442,651

(22) PCT Filed: Nov. 21, 2012

(86) PCT No.: PCT/KR2012/009845
§ 371 (c)(1),
(2) Date: May 13, 2015

(87) PCT Pub. No.: WO2014/077441
PCT Pub. Date: May 22, 2014

(65) Prior Publication Data
US 2015/0348413 A1    Dec. 3, 2015

(30) Foreign Application Priority Data

Nov. 13, 2012  (KR) .................. 10-2012-0128429

(51) Int. Cl.
| | |
|---|---|
| G08G 1/01 | (2006.01) |
| G08G 1/133 | (2006.01) |
| G08G 1/16 | (2006.01) |
| G01S 5/00 | (2006.01) |

(52) U.S. Cl.
CPC ............ G08G 1/133 (2013.01); G01S 5/0072 (2013.01); G08G 1/01 (2013.01); G08G 1/163 (2013.01); G08G 1/166 (2013.01)

(58) Field of Classification Search
CPC .................................. B60R 1/00; G08G 1/00
See application file for complete search history.

(56) References Cited

U.S. PATENT DOCUMENTS

| | | | |
|---|---|---|---|
| 6,268,804 B1 | 7/2001 | Janky et al. | |
| 2007/0117525 A1* | 5/2007 | Osafune | G08G 1/20 455/99 |
| 2009/0228172 A1 | 9/2009 | Markyvech et al. | |
| 2012/0150405 A1* | 6/2012 | Fukawa | G01S 3/28 701/70 |

FOREIGN PATENT DOCUMENTS

| | | |
|---|---|---|
| JP | 2009-257763 A | 11/2009 |
| KR | 10-2009-0122543 A | 12/2009 |

\* cited by examiner

*Primary Examiner* — Shirley Lu
(74) *Attorney, Agent, or Firm* — Porzio, Bromberg & Newman, P.C.

(57) ABSTRACT

The present disclosure relates to an apparatus and method for detecting the surrounding vehicle via vehicular communication, and more particularly, an apparatus and method for detecting surrounding vehicle that detects location of surrounding vehicles more accurately through the a message transmitted from surrounding vehicles.

16 Claims, 5 Drawing Sheets

APPARATUS AND METHOD FOR DETECTING NEARBY VEHICLES THROUGH INTER-VEHICLE COMMUNICATION

TECHNICAL FIELD

The present disclosure relates to an apparatus and method for detecting the surrounding vehicle via vehicular communication, and more particularly, an apparatus and method for detecting surrounding vehicle that detects location of surrounding vehicles more accurately through the a message transmitted from surrounding vehicles.

BACKGROUND

Generally, a side-view mirror is installed on left/right side of a vehicle and a room mirror is installed between a driver's seat and a passenger seat in a vehicle to check the rear of a driving vehicle. That is, when a driver wants to change the driving lane, the driver checks the distance between an object that may exist on the left/right side and rear of the vehicle and etc. with the driver's naked eye through the left/right side mirror and room mirror then self-determines safety, thereby changes the lane.

However, most of the side mirrors and room mirror is adjusted according to the driver's height or the position of the driver, thereby the angle is maintained once the angle is adjusted. Accordingly, objects of the left/right side and rear side that exist within the adjusted angle may be seen.

That is, the angle of the side mirror and room mirror installed on a both side unit of a vehicle is maintained as it is, thereby an object that exist outside of the reflecting angle of the side mirror, that is, an object that is located in a blind spot, cannot be checked through the side mirror and the room mirror.

In an effort to solve this problem, there is a way of installing a special auxiliary mirror aside from a left/right side mirror and room mirror to even check a blind spot. However, this is inconvenient for the driver since the driver has to check not only the left/right side mirror and room mirror but also the auxiliary mirror while driving the vehicle. Further, there is a problem that accurate recognition of an object is difficult through the auxiliary mirror. Further, in case of foggy or rainy weather, a driver has difficulty of accurately recognizing the front road environment, thereby there is a problem of clearly checking a driving vehicle in front.

SUMMARY OF INVENTION SOLUTION TO PROBLEM

The present description relates to an apparatus and method of detecting surrounding vehicles that may provide a more comfortable driving environment by relieving the burden that a driver has to look around for surrounding vehicle location by himself.

Specifically, the present description relates to a surrounding vehicle detecting apparatus and method thereof that can detect surrounding vehicles via related information transmitted from surrounding vehicles not detecting surrounding vehicles through a self-installed sensor device.

Technical Solutions

An apparatus for detecting surrounding vehicles according to an embodiment of the present description includes a receiver configured to receive a first detecting message including information regarding a detecting vehicle that is broadcasted from a first vehicle; a location determining unit configured to detect a location of the first vehicle with reference to a personal vehicle when the detecting vehicle is determined as a personal vehicle using the first detecting message.

Preferably, a display unit configured to display the location of the first vehicle that is determined through the location determining unit can be further included.

Herein, the first detecting message may further include at least one of relative location information of the first vehicle contrast to detecting vehicle, estimated location information of the detecting vehicle, identification information of the detecting vehicle, vehicle model information of the detecting vehicle, vehicle size information of the detecting vehicle, speed information of the detecting vehicle, lane information that the detecting vehicle is driving.

According to an embodiment of the present description, the surrounding vehicle detecting apparatus may further include a first sensor unit configured to collect a detecting information regarding a second vehicle, a second sensor unit configured to collect detecting information regarding the personal information, a message generator configured to generate a second detecting message using sensing information that is collected through the first sensor unit and the second sensor unit, and a transmitter configured to broadcast the second detecting message to the second vehicle.

Herein, the first sensor unit may include at least one of selected from camera, radar, ultrasonic wave sensor, and signal processing device.

Further, the second sensor unit can include a GPS receiver.

Herein the second detecting message may further include at least one of relative location information of a second vehicle contrast to the personal vehicle, estimated location information of the second vehicle, identification information of the second vehicle, vehicle model information of the second vehicle, size information of the second vehicle, speed information of the second vehicle, driving lane information of the second vehicle.

According to an embodiment of the present description, a method of receiving and transmitting a first and second detecting message through the transmitter and receiver may be based on WAVE communication standard of IEEE 802.11p.

A method for detecting surrounding vehicle according to an embodiment of the present description includes steps of receiving a first detecting message including information regarding detected vehicle that is broadcasted from a first vehicle, step (A); determining location of the first vehicle with reference to a personal vehicle when the detected vehicle is determined as a personal vehicle using the first detecting message that is received through the step (A) and (B).

Preferably, the method for detecting surrounding vehicle may further include step of displaying the location of the first vehicle that is determined through the step (B) and (C).

Herein, the first detecting message may include at least one of selected from relative information of detecting vehicle contrast to the first vehicle, estimated location information of the detecting vehicle, identification information of the detecting vehicle, vehicle model information of the detecting vehicle, vehicle size information of the detecting vehicle, speed information of the detecting vehicle, driving lane information of the detecting vehicle.

According to an embodiment of the present description, the surrounding detecting method may further include steps of first sensing that is collecting detecting information regarding a second vehicle, step (D); a second sensing that is collecting detecting information regarding the personal vehicle, step (E); message generating that is generating a second detecting message using sensing information collected through the step (D) and step (E) and (F), and transmitting that is broadcasting the second detecting message to the second vehicle, step (G).

Herein, the step (D) may collect sensing information using at least one of selected from camera, radar, ultrasonic wave sensor, and signal processing device.

Further, the step (E) may collect location information of the personal vehicle using a GPS receiver.

Herein the second detecting message may include at least one of selected from relative location information of a second vehicle contrast to the personal vehicle, estimated location information of the second vehicle, identification information of the second vehicle, vehicle model information of the second vehicle, size information of the second vehicle, speed information of the second vehicle, driving lane information of the second vehicle.

According to an embodiment of the present description, a method for receiving and transmitting a first and second detecting message through the step (A) and (G) may be based on WAVE communication standard of IEEE 802.11p.

Effects of Invention

An apparatus and method for detecting a surrounding vehicle according to an embodiment of the present description may detect surrounding vehicles without a driver looking out the surrounding of a vehicle through receiving state information of the surrounding vehicle transmitted from surrounding vehicles using communication technology via inter-vehicles.

METHOD FOR CARRYING OUT THE INVENTION

Figure 1:
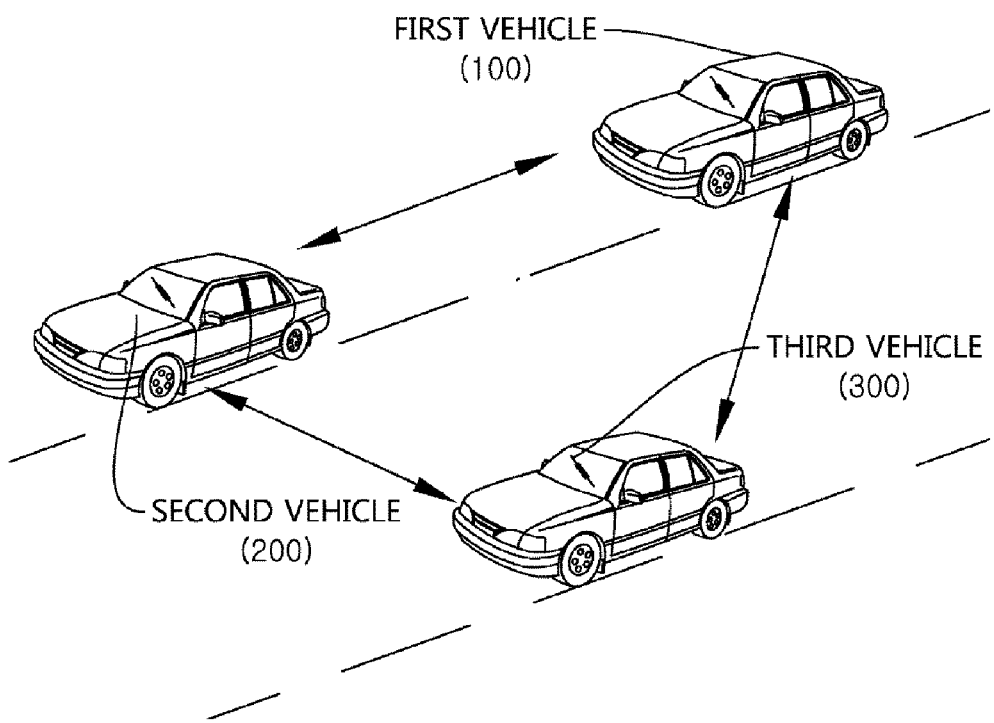
FIG. 1 is a diagram illustrating an entire feature of detecting surrounding vehicles using the present description.

Certain exemplary embodiments of the present inventive concept will now be described in greater detail with reference to the accompanying drawings. In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

While the expressions such as "first" or "second" can be used to refer to various elements, the elements are not limited by the expressions. The expressions are used only for the purpose of distinguishing one element from the other.

The expressions are used herein only for the purpose of explaining specific embodiments and not to limit the present disclosure. An expression in singular form encompasses plural meaning, unless otherwise specified. Throughout the description, the expression "comprise" or "have" is used only to designate the existence of characteristic, number, step, operation, element, component or a combination thereof which are described herein, but not to preclude possibility of existence of one or more of the other characteristics, numbers, steps, operations, elements, components or combinations of these or addition.

Hereinafter, an embodiment of the present disclosure is described in detail referring to the attached drawings.

FIG. 1 is a diagram illustrating an entire feature detecting surrounding vehicles using the present description, As shown in FIG. 1, according to an embodiment of the present description, a first vehicle 100, a second vehicle 200, and a third vehicle 300 may transmit and receive detecting message including information regarding inter-detecting vehicle. Preferably, since the first vehicle 100, the second vehicle 200 and the third vehicle 300 is driving in high speed, a method for transmitting and receiving the inter-vehicle detecting message may be based on WAVE communication standard technology of IEEE 802.11p. An ordinary skilled person in the related field of the present description may understand that the inter-vehicle communication technology may be configured in a form within the range of the original feature of the present description.

However, according to a detailed description of an embodiment of the present description in FIG. 1, the feature is illustrated limited to detecting the first vehicle 100 with reference to the third vehicle, using a detected message that the third vehicle 300 receives from the first vehicle 100, and a feature of the third vehicle 300 transmits detecting information regarding the second vehicle 200 to the second vehicle 200.

First, according to an embodiment of the present description, detecting message including detecting information regarding the third vehicle 300 is received from the first vehicle 100 and the first vehicle 100 location may be detected using the detecting message. Hereinafter, FIG. 2 illustrates in detail.

Figure 2:
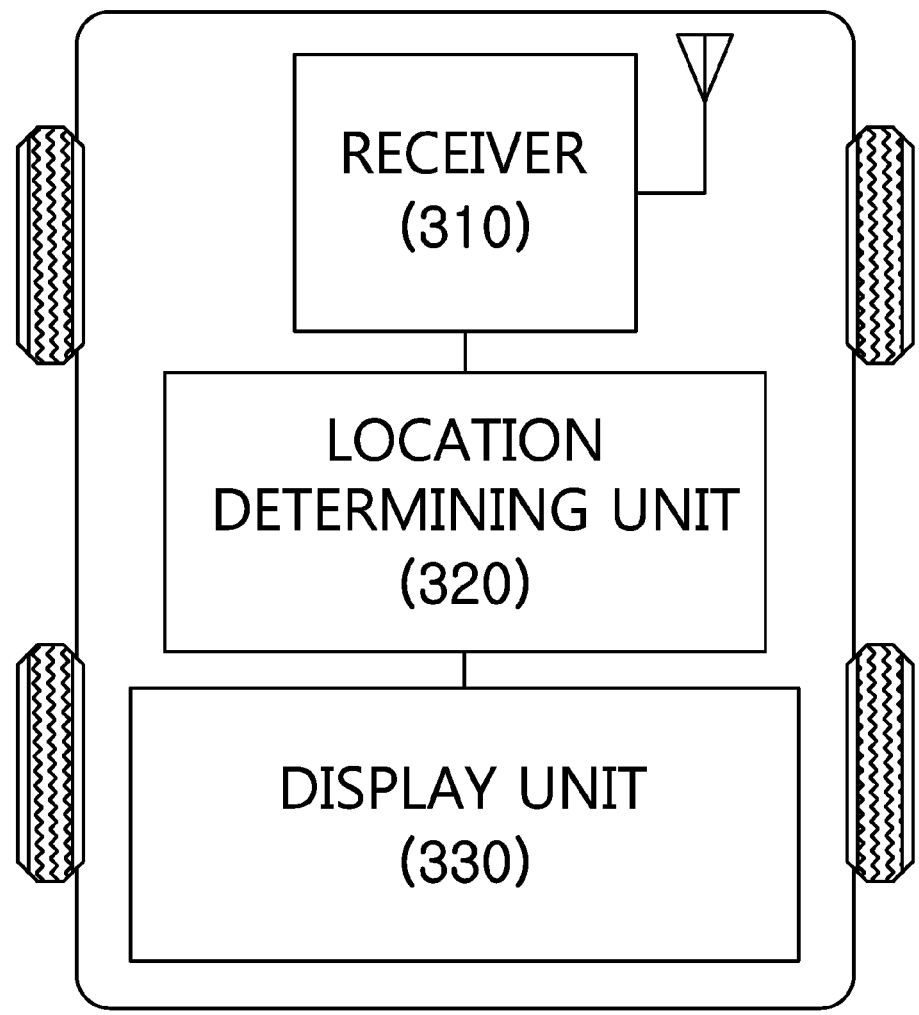
FIG. 2 is a diagram illustrating surrounding vehicle detecting apparatus according to an embodiment of the present description.

FIG. 2 is a diagram illustrating surrounding vehicle detecting apparatus according to an embodiment of the present description.

As shown in FIG. 2, an apparatus for detecting surrounding vehicle according to an embodiment of the present description comprises a receiver 310 configured to receive a first detecting message including information regarding detecting vehicle that is broadcasted from a first vehicle, and a location determining unit 320 configured to determine the first vehicle location with reference to a personal vehicle when the detecting vehicle is detected as a personal vehicle using the first detecting message. Preferably, the location determining unit 320 may further include a display unit 330 configured to display the first vehicle location that is determined through the location determining unit 320.

The receiver 310 receives the first detecting message including information regarding detected vehicle that is broadcasted from the first vehicle. According to an embodiment of the present description, surrounding vehicle detecting apparatus use a communication method for inter-vehicle that is driving high speed, thereby a method for receiving the first detecting message through the receiver 310 may be based on WAVE communication standard of IEEE 802.11p.

Figure 3:
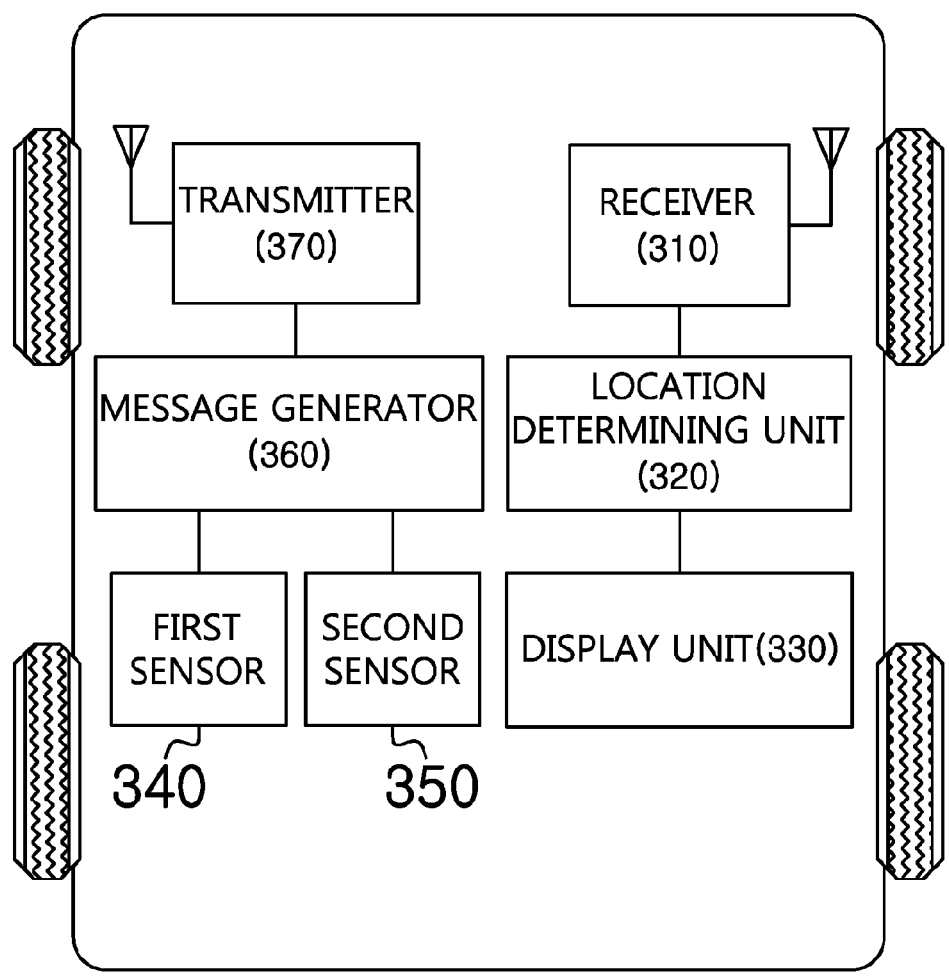
FIG. 3 is a diagram illustrating a surrounding vehicle detecting apparatus according to an embodiment of the present description.

Herein, the first detecting message that is received through the receiver 310 may include at least one of selected from a relative location information of detecting vehicle contrast to the first vehicle, estimated location information of the detected vehicle, identification information of the detected vehicle, vehicle model information of the detected vehicle, vehicle size information of the detected vehicle, speed information of the detected vehicle, driving lane information of the detected vehicle. For example, the first detecting message may include information regarding how far the detected vehicle is from the first vehicle in the right direction, the speed of the detected vehicle, the lane of the detected vehicle is driving. Collecting method of the information is illustrated in FIG. 3 hereinafter.

The location determining unit 320 determines the first vehicle location when the detected vehicle is detected as a personal vehicle using the first detected message.

More particularly, first, the location determining unit 320 determines whether the information related to detecting vehicle included in the first detecting message is in regards to a personal vehicle using the received first detecting message. According to an embodiment of the present description, the location determining unit 320 may determine whether the detecting vehicle is a personal vehicle using estimated location information of the detected vehicle, identification information of the detected vehicle, size information of the detected vehicle, speed information of the detected vehicle, lane information the detected vehicle is driving thereof and etc. For example, the detected vehicle may be determined as a personal vehicle or not through comparing estimate location information of the detected vehicle with a location information of the personal vehicle or through determining whether the identification information regarding the detected vehicle is identical with identification information of the personal vehicle. Further, the detected vehicle can be determined as a personal vehicle or not through determining whether speed information of the detected vehicle is identical with speed information of the personal vehicle, driving lane information of the detected vehicle is identical with the driving lane information of personal vehicle or whether vehicle model and size information of the detected vehicle and personal are identical.

The location determining unit 320 determines the first vehicle location with reference to the personal vehicle when detected vehicle information included in the first detected message is determined as the information of the personal vehicle through the above process. Herein, the location determining unit 320 may determine the first vehicle location using information included in the first detecting message.

According to an embodiment of the present description, the location determining unit 320 can determine the first vehicle location using relative location information of the detected vehicle contrast to the first vehicle. For example, when receiving a detected message that the detected vehicle is located on (2,1) when the first vehicle location is (0,0) from the first vehicle, the apparatus of the present description can detect that the first vehicle is located on (−2, −1) when the current personal vehicle location is (0,0) using the above procedure.

Further, when absolute location information (GPS etc.) of the first vehicle is included in the first detected message, the location determining unit 320 can determine the first vehicle location, by additionally using absolute location information of the first vehicle. An ordinary skilled person in the related field of the present description may understand the method of determining the first vehicle location may be configured in a form within the range of the original feature of the present description.

According to an embodiment of the present description, an apparatus for detecting surrounding vehicles may further include a display unit 330 configured to display a first vehicle location that is determined through the location determining unit 320. The display unit 330 may notice a driver the current location of the first vehicle by displaying the first vehicle location contrast to the personal vehicle.

The display unit 330 may be applied with a display apparatus of CRT, LCD, PDP, OLED and etc. An ordinary skilled person in the related field of the present description may understand that the display unit 330 may be configured in a form within the range of the original feature of the present description.

The third vehicle 300 can determine the first vehicle location through the afore-mentioned method.

Further, according to an embodiment of the present description, the third vehicle 300 can transmit determining information regarding the second vehicle 200 to the second vehicle 200. The second vehicle 200 receiving the above information can detect the third vehicle 300 location through the afore-mentioned method. Hereinafter, FIG. 3 illustrate a feature of the third vehicle 300 transmitting detecting information regarding the second vehicle 200 to the second vehicle 200.

FIG. 3 is a diagram illustrating a surrounding vehicle detecting apparatus according to an embodiment of the present description.

As shown in FIG. 3, according to an embodiment of the present description, an apparatus for detecting surrounding vehicles may further include a receiver 310 configured to receive a first detecting message including information regarding detected vehicle that is broadcasted from the first vehicle, a location determining unit 320 configured to determine the first vehicle location with reference to the personal vehicle when the detected vehicle is determined as a personal vehicle using the first detecting message, a first sensor 340 configured to collect a detecting information regarding a second vehicle, a second sensor 350 configured to collect detecting information regarding the personal vehicle, a message generator 360 configured to generate a second detecting message using sensing information that is collected through the first sensor unit 340 and a second sensor unit 350, and a transmitter 370 that broadcast the second detecting message to the second vehicle.

The receiver 310, and the location determining unit 320 are afore-mentioned in detail, hence omitted hereinafter.

The first sensor 340 collects detecting information regarding the second vehicle. In FIG. 1, the third vehicle 300 collects related information of the first vehicle 100 and the second vehicle 200 that are located around the third vehicle. According to an embodiment of the present description, the first sensor 340 can collect at least one of surrounding vehicle related information. However, in FIG. 1, the third vehicle 300 illustrates limiting to a feature of collecting detecting information regarding the second vehicle 200 through the first sensor 340.

According to an embodiment of the present description, the first sensor 340 may include at least one of selected from camera, radar, ultrasonic sensor, and signal processing device.

According to an embodiment selecting camera as the first sensor 340, the first sensor 340 can collect distance and direction information from a personal vehicle to a second vehicle using image information regarding the second vehicle that is collected through the camera. Further, vehicle model information of the second vehicle, size information of the second vehicle, speed information of the second vehicle, driving lane information of the second vehicle can be collected using image information regarding the second vehicle that is collected through the camera. According to an embodiment of a technical feature of collecting detecting information regarding the second vehicle using the first sensor 340, speed information of a second vehicle is collected by processing image information that is collected every certain period or driving lane information of a the second vehicle by extracting lane information among collected image information. However, the embodiment is merely an embodiment, hence a technical feature of the first sensor 340 collecting the information can be applied with various publicly known image processing technologies.

According to an embodiment in that the first sensor unit 340 is selected as a radar, the first sensor 340 can collect distance to the second vehicle, direction information, speed information of the second vehicle, driving lane information of the second vehicle and etc. For example, speed information of the second vehicle can be extracted through change amount of distance information to the second vehicle that is collected every certain period and the driving lane information of the second vehicle can be estimated using distance to the second vehicle, distance information. However, the embodiment is merely an embodiment, hence a technical feature of the first sensor 340 collecting the information can be applied with various publicly known image processing technologies.

According to an embodiment of the first sensor 340 selected as an ultrasonic wave sensor, the information can be collected similar to the embodiment of the radar. The embodiment is illustrated related thereof, hence omitted hereinafter.

According to an embodiment of the first sensor 340 selected as a signal processing device, the first sensor 340 can collect identification information of the second vehicle using beacon message that is received from the second vehicle. For example, referring to signal intensity (RSSI) of the beacon message received from the second vehicle, the first sensor 340 can determine whether the second vehicle is identical with the detected detecting vehicle through other sensor devices. However, the embodiment is merely an embodiment, hence a technical feature of the first sensor 340 collecting the information can be applied with various publicly known image processing technologies.

A second sensor 350 collects detecting information regarding personal vehicle. According to an embodiment of the present description, the second sensor 350 can collect location information of the personal vehicle through the GPS information, including a GPS receiver.

Further, the second sensor 350 can collect speed information of current personal vehicle, steering angle information and etc. through CAN(Controller Area Network), LIN (Local Interconnect Network), IVN (In Vehicle Network) and etc. However, the embodiment is merely an embodiment, hence information related to a personal vehicle collected by the second sensor 350 can be formed in varied form within the range of an original feature of the present description.

A message generator 360 generates a second detecting message using sensing information collected through the first sensor 340 and the second sensor 350. More particularly, the message sensor unit 360 generates a second detecting message using detecting information regarding detecting vehicle collected through the first sensor 350 and, detecting information regarding a personal vehicle that is collected through the second sensor 350.

Herein, the second detecting message according to an embodiment of the present description may include at least one of selected from relative location information of the second vehicle contrast to the personal vehicle, estimated location information of the second vehicle, identification information of the second vehicle, vehicle model information of the second vehicle, size information of the second vehicle, speed information of the second vehicle, driving lane information of the second vehicle.

For example, the message generator 360 can generate a second detecting message including relative location information of the second vehicle with reference to the personal vehicle using direction and distance information from the personal vehicle to the second vehicle that is collected through the first sensor 340, speed information of the second vehicle. Further, the message generator 360 can generate a second transmitting message including estimated location information of the second vehicle using location information such as relative location information of the second vehicle that is collected through the first sensor 340 and GPS information of the personal vehicle that is collected through the second sensor 350.

Further, the message generator 360 can generate a second detecting message including information that can specify the second vehicle using identification information of the second vehicle that is collected through the first sensor 340, vehicle model information of the second vehicle, vehicle size information of the second vehicle, speed information of the second vehicle, driving lane information of the second vehicle.

A transmitter 370 broadcasts the second detecting message to the second vehicle. An apparatus for detecting surrounding vehicles according to an embodiment of the present description use a high speed driving inter-vehicle communication method, hence a method for the transmitter 370 transmitting the second detecting message can be based on WAVE communication standard of IEEE 802.11p.

That is, in FIG. 1, the third vehicle 300 collects detecting information regarding the second vehicle 200 such as distance and direction information from the third vehicle 300 to the second vehicle 200, vehicle model information of the second vehicle 200, size information of the second vehicle 200, speed information of the second vehicle 200, driving lane information of the second vehicle 200, and collects detecting information regarding the third vehicle 300 such as location information including GPS information of the third vehicle 300, detecting information regarding the third vehicle 300 such as speed information of the third vehicle 300, steering angle information and etc. and generates the second detecting message using the information, thereby the third vehicle 300 can broadcast the second detecting message to the second vehicle 200. Through this, the second vehicle 200 can detect state information of the third vehicle 300 location and etc.

Figure 4:
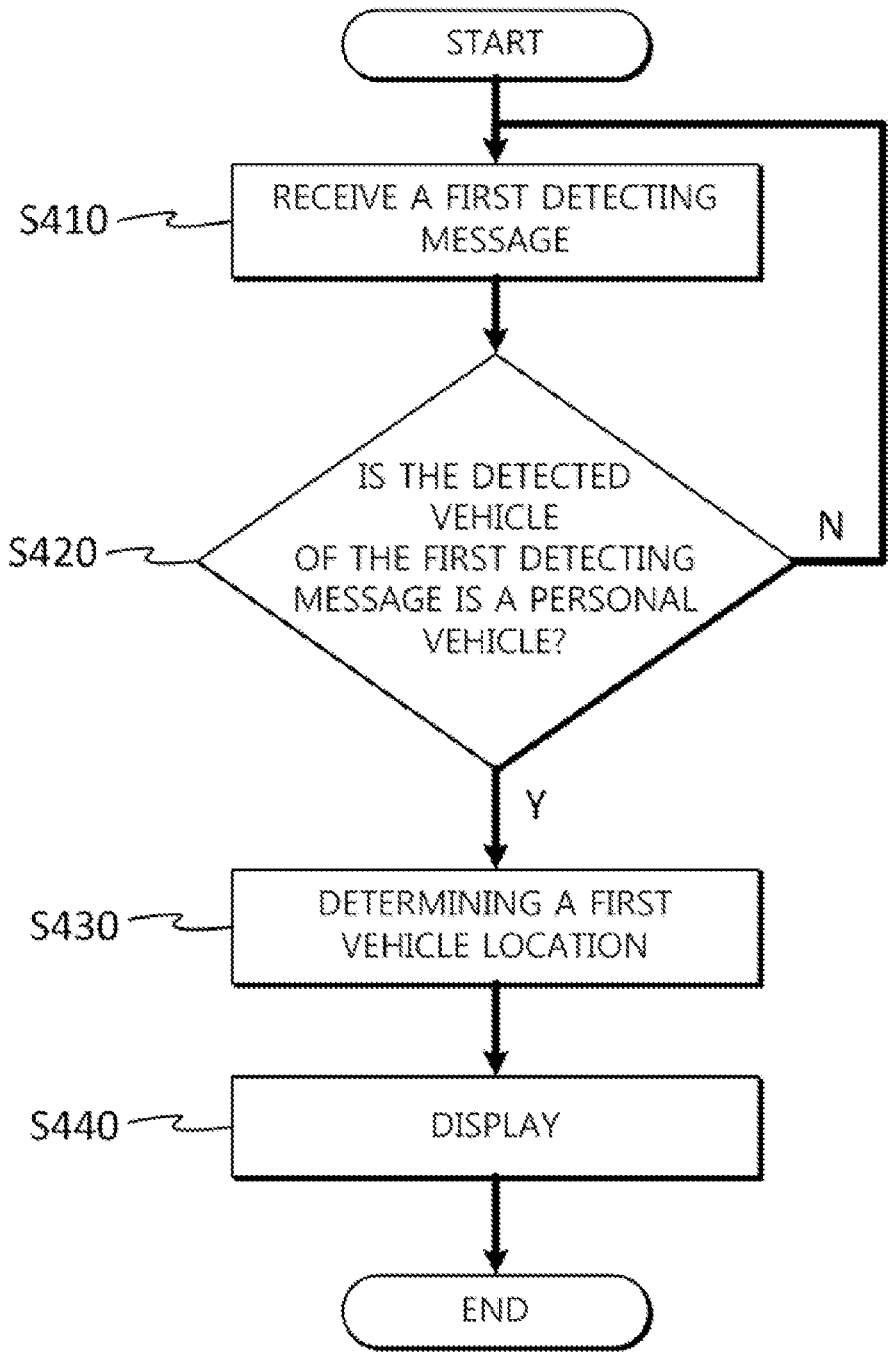
FIG. 4 is a flow chart illustrating a method for receiving a first detecting message including a detecting information regarding a personal vehicle according to an embodiment of the present description.

FIG. 4 is a flow chart illustrating a method for receiving a first detecting message including a detecting information regarding a personal vehicle according to an embodiment of the present description.

As shown in FIG. 4, a method for detecting surrounding vehicles according to an embodiment of the present description includes steps of receiving a first detecting message including information regarding detected vehicles broadcasted from the first vehicle; determining location step that determines location of the first vehicle with reference to the personal vehicle when the detected vehicle is determined as the personal vehicle using the first detecting message that is received through step (A). Preferably, displaying step that displays location of the first vehicle that is determined through step (B) can be further included.

Receive the first detecting message from surrounding vehicle S410. Herein, The first detecting message may be received through the receiver 310 that is configured in a vehicle. In a method for detecting surrounding vehicles according to an embodiment of the present description, the method for receiving the first detecting message can follow WAVE communication standard of IEEE 802.11p that is applicable in a high speed driving communication environment.

Herein, the first detecting message that is received through the S410 may include at least one of selected from relative location information of the detected vehicle in contrast to the first vehicle, estimated location information of the detected vehicle, identification information of the detected vehicle, vehicle model information of the detected vehicle, size information of the detected vehicle, speed information of the detected vehicle, and driving lane information of the detected vehicle. For example, the first detecting message may include information regarding how far the detected vehicle is away from the first vehicle in a right direction, speed of the detected vehicle, the lane of the detected vehicle is driving and etc. Method for collecting the information is illustrated hereinafter in FIG. 5.

Through the S410, the detected vehicle in the received first detected message determines if it is a personal vehicle S420. More particularly, in the S420, determines whether information related to the detected vehicle that is included in the first detecting message is information regarding the personal vehicle using the first detecting message that is received through the S410. According to an embodiment of the present description, the S420 can determine whether the detected vehicle is a personal vehicle using vehicle model information of the detected vehicle, size information of the detected vehicle, speed information of the detected vehicle, and driving lane information of the detected vehicle. For example, through comparing estimated location information of the detected information with location information of a current personal vehicle, or determining whether identification information of the detected vehicle is identical with identification information of the personal vehicle. Further, S410 determines whether the detected vehicle is the personal vehicle through determining whether speed information of the detected vehicle is identical with speed information of the personal vehicle, whether driving lane information of the detected vehicle is identical with driving lane information of the personal vehicle, or determining whether vehicle model and size information of the detected vehicle is identical with the information of the personal vehicle thereof.

When the detected vehicle is determined as the personal vehicle through the S420, the first vehicle location is determined with reference to a personal vehicle S430. Herein, in the S430, the first vehicle location can be determined using information included in the first detecting message.

In S430 according to an embodiment of the present description, the first vehicle location can be determined using relative location information of the detected vehicle in contrast to the first vehicle. For example, when receiving a detecting message that when the first vehicle location is (0,0), the detected vehicle is (2,1), it can be detected that the first vehicle is located on (−2,−1) when the current personal vehicle location is (0,0).

Further, when absolute location information (GPS and etc.) of the first vehicle is included in the first detecting message, the first vehicle location can be determined additionally using absolute location information of the first vehicle in the S430. An ordinary skilled person in the related art of the present description may understand that a method for determining the first vehicle location can be configured within the range of the original feature of the present description.

The first vehicle location that is detected through the S430 can be displayed through a special display device S440. By displaying the first vehicle location contrast to the personal vehicle through the S440, current location of the first vehicle can be noticed to a driver.

Herein, the display device can be applied with a display devices such as CRT, LCD, PDP, OLED and etc. An ordinary skilled person in the related art of the present description may understand that the display device can be configured within the range of the original feature of the present description.

A third vehicle 300 of FIG. 1 may detect the first vehicle 100 location through the afore-mentioned method.

The third vehicle 300 according to an embodiment of the present description can transmit a detecting information of the second vehicle 200 to the second vehicle 200. The second vehicle that receives the information can detect the third vehicle 300 location through the afore-mentioned method. Hereinafter illustrates a feature of the third vehicle 300 transmitting detecting information of the second vehicle 200 to the second vehicle 200 through FIG. 5.

Figure 5:
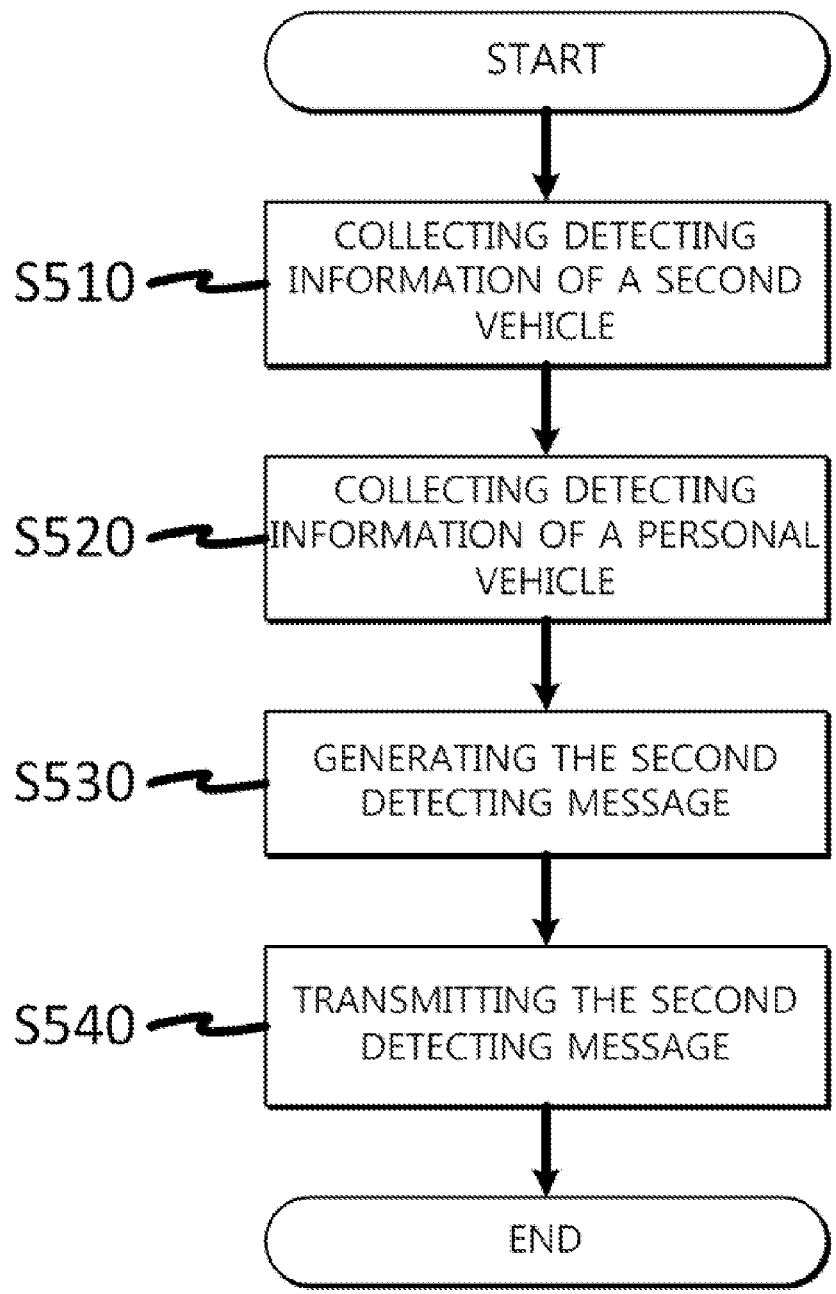
FIG. 5 is a flow chart illustrating a method of transmitting a second detecting message including detecting information regarding detected vehicle according to an embodiment of the present description.

FIG. 5 is a flow chart illustrating a method of transmitting a second detecting message including detecting information regarding detected vehicle according to an embodiment of the present description.

As illustrated in FIG. 5, a method for detecting surrounding vehicles includes step (A) receiving a first detecting message including information of detected vehicles that is broadcasted from a first vehicle; step (B) determining the first vehicle location using the first detecting message that is received through step (A); step (C) displaying the first vehicle location that is determined through step (B); step (D) a first sensing that collects detected information regarding a second vehicle; step (E) a second sensing that collects sensing information regarding the personal vehicle; step (F) message generating that generates a second detecting message using sensing information that is collected through step (D) and (E); step (G) transmitting that broadcasts the second detecting message to the second vehicle.

Regarding step (A), (B) and (C) are afore-mentioned, thereby omitted hereinafter.

Collect detecting information of the second vehicle using special sensor devices S510. In FIG. 1, the third vehicle 300 collects information regarding the first vehicle and second vehicle that are located around the third vehicle 300. According to an embodiment of the present description, at least one information of surrounding vehicles can be collected in the S510. However, illustration in FIG. 1 is limited to a feature of a third vehicle 300 collecting detecting information of the second vehicle through the first sensor 340.

According to an embodiment of the present description, the S510 may collect sensing information using at least one of selected from camera, radar ultrasonic wave sensor, signal processing device.

According to an embodiment of collecting sensing information using the camera, distance from a personal vehicle to a second vehicle and direction information and etc. can be collected using image information of the second vehicle that is collected through the camera in the S510. Further, vehicle model information of the second vehicle, size information of the second vehicle, speed information of the second vehicle, driving lane information of the second vehicle and etc. can also be collected using image information of the second vehicle. In S510, according to an embodiment of a technical feature of collecting detecting information of the second vehicle, speed information of the second vehicle through processing image information that is collected every certain period, or can collect driving lane information of the second vehicle through extracting lane information among collected image information. However, the above embodiment is merely an embodiment, thus a technical feature collecting the information in the S510 can be applied with various image processing technologies.

Further, according to an embodiment of collecting sensing information using radar, in the S510, distance and direction information to the second vehicle, speed information of the second vehicle, driving lane information of the second vehicle and etc. can be collected. For example, speed information of the second vehicle can be extracted through change amount of information of distance to the second vehicle that is collected every certain period and the second vehicle driving lane information can be estimated using information of distance to the second vehicle and direction. However, the embodiment is merely an embodiment thus, a technical feature of collecting information of the S510 can be applied with various publicly known signal processing technology.

Further, according to an embodiment of collecting sensing information using ultrasonic wave sensor, the information can be collected similar to the embodiment of the radar. This is illustrated through the embodiment, thus omitted hereinafter.

Further, according to an embodiment of collecting sensing information using signal processing device, identification information of the second vehicle can be collected using a beacon message that is received from the second vehicle. For example, a personal vehicle can determine whether the second vehicle is identical with the detected detecting vehicle referring to signal intensity (RSSI) of a received beacon message from the second vehicle. However, the above embodiment is merely an embodiment, thus a technical feature of collecting the information can be applied with various publicly know signal processing technologies.

Further, collects detecting information of a personal vehicle S520. According to an embodiment of the present description, the S520 can collect location information of the personal vehicle using a GPS receiver.

Further, the S520 can collect speed information of a current personal vehicle, steering angle information through CAN (Controller Area Network), LIN (Local Interconnect Network), IVN (In Vehicle Network) and etc. An ordinary skilled person in the related art of the present description may understand that information related to a personal vehicle that is collected in the S520 can be configured within the range of the original feature of the present description.

According to an embodiment of the present description, operation of the S510 and S520 can be implemented simultaneously and S510 can first be implemented or S510 can be implemented later than S520.

Further, generates the second detecting message using sensing information that is collected through the S510 and S520 S530. More particularly, the S530 generates the second detecting message using detecting information of detected vehicle that is collected through the S510 and detecting information of a personal vehicle collected through the S520.

Herein, the second detecting message according to an embodiment of the present description may include at least one of relative location information of the second vehicle in contrast to the personal vehicle, estimated location information of the second vehicle, identification information of the second vehicle, vehicle model information of the second vehicle, size information of the second vehicle, speed information of the second vehicle, driving lane information of the second vehicle.

For example, in the S530, a second detecting message can be generated including relative location information of the second vehicle with reference to a personal vehicle using information of distance from a personal vehicle to a second vehicle and direction, speed information of the second vehicle and etc. that are collected through the S510. Further, in S530, a second transmitting message can be generated including estimated location information of the second vehicle using relative location information of the second vehicle collected through the S510 and location information such as GPS information and etc. of the personal vehicle that is collected through the second sensor 350.

Further, in S530, a second detecting message can be generated including information that can identify the second vehicle using identification information of the second vehicle, model information of the second vehicle, vehicle size information of the second vehicle, speed information of the second vehicle, driving lane information of the second vehicle and etc. that are collected through the S510.

That is, in FIG. 1, the third vehicle 300 can collect detecting information of the second vehicle 200 of information of distance to the second vehicle 200 and direction, vehicle model information of the second vehicle 200, size information of the second vehicle 200, speed information of the second vehicle 200, driving lane information of the second vehicle 200, and collects detecting information of the third vehicle 300 of location information including GPS information of the third vehicle 300, speed information of the third vehicle 300, steering angle information and etc. of the third vehicle 300, and generates the second detecting message using the above information, thereby the third vehicle can broadcast the second detecting message to the second vehicle 200. Through this, the second vehicle 200 can detect state information of the third vehicle location and etc.

The preferred embodiments of the invention have been explained so far. a person skilled in the art will understand that the invention may be implemented in modifications without departing from the basic characteristics of the invention. Accordingly, the foregoing exemplary embodiments and advantages are merely exemplary and are not to be construed as limiting the present disclosure. The present teaching can be readily applied to other types of apparatuses. Also, the description of the exemplary embodiments of the present inventive concept is intended to be illustrative, and not to limit the scope of the claims.

What is claimed is:

1. An apparatus for detecting surrounding vehicles, comprising:
a receiver configured to receive a first detecting message comprising information comprising a detected vehicle that is broadcasted from a first vehicle; a location determining unit configured to detect a location of the first vehicle with reference to a personal vehicle when the detecting vehicle is determined as a personal vehicle using the first detecting message, wherein the first detecting message comprises absolute location information of the first vehicle and relative location information of the first vehicle with reference to the detecting vehicle.

2. The apparatus for detecting surrounding vehicles of claim 1, further comprising: a display unit configured to display the location of the first vehicle that is determined through the location determining unit.

3. The apparatus for detecting surrounding vehicles of claim 1,
wherein the first detecting message further comprises, estimated location information of the detecting vehicle, identification information of the detecting vehicle, vehicle model information of the detecting vehicle, vehicle size information of the detecting vehicle, speed information of the detecting vehicle, lane information that the detecting vehicle is driving.

4. The apparatus for detecting surrounding vehicles of claim 1, further comprising: a first sensor unit configured to collect a detecting information regarding a second vehicle, a second sensor unit configured to collect a detecting information regarding the personal information, a message generator configured to generate a second detecting message using sensing information that is collected through the first sensor unit and the second sensor unit, and a transmitter configured to broadcast the second detecting message to the second vehicle.

5. The apparatus for detecting surrounding vehicles of claim 4, wherein the first sensor unit comprises at least one of selected from camera, radar, ultrasonic wave sensor, and signal processing device.

6. The apparatus for detecting surrounding vehicles of claim 4, wherein the second sensor unit comprises a GPS receiver.

7. The apparatus for detecting surrounding vehicles of claim 4, wherein the second detecting message comprises at least one of selected from relative location information of a second vehicle with reference to the personal vehicle, estimated location information of the second vehicle, identification information of the second vehicle, vehicle model information of the second vehicle, size information of the second vehicle, speed information of the second vehicle, driving lane information of the second vehicle.

8. The apparatus for detecting surrounding vehicles of claim 4, wherein a method of receiving and transmitting the first and second detecting message through the transmitter and receiver based on WAVE communication standard of IEEE 802.11p.

9. A method for detecting surrounding vehicles comprising:
(A) receiving a first detecting message comprising information regarding detected vehicle that is broadcasted from a first vehicle,
(B) determining the location of the first vehicle with reference to a personal vehicle when the detected vehicle is determined as a personal vehicle using the first detecting message that is received through the step (A),
wherein the first detecting message comprises absolute location information of the first vehicle and relative location information of the first vehicle with reference to the detecting vehicle.

10. The method for detecting surrounding vehicles of claim 9, further comprising (C) displaying the location of the first vehicle that is determined through the step (B).

11. The method for detecting surrounding vehicles of claim 9, wherein the first detecting further message comprising at least one of, estimated location information of the detecting vehicle, identification information of the detecting vehicle, vehicle model information of the detecting vehicle, vehicle size information of the detecting vehicle, speed information of the detecting vehicle, driving lane information of the detecting vehicle.

12. The method for detecting surrounding vehicles of claim 9, further comprising, (D) first sensing that is collecting detecting information regarding a second vehicle, (E) a second sensing that is collecting detecting information regarding the personal vehicle, (F) message generating that is generating a second detecting message using sensing information collected through the step (D) and (E), and (G) transmitting that is broadcasting the second detecting message to the second vehicle.

13. The method for detecting surrounding vehicles of claim 12, wherein the step (D) collects sensing information using at least one of selected from camera, radar, ultrasonic wave sensor, signal processing device.

14. The method for detecting surrounding vehicles of claim 12, wherein the step (E) collects location information of the personal vehicle using a GPS receiver.

15. The method for detecting surrounding vehicles of claim 12, wherein the second detecting message comprises at least one of selected from relative location information of a second vehicle with reference to the personal vehicle, estimated location information of the second vehicle, identification information of the second vehicle, vehicle model information of the second vehicle, size information of the second vehicle, speed information of the second vehicle, driving lane information of the second vehicle.

16. The method for detecting surrounding vehicles of claim 12, wherein a method for receiving and transmitting a first and second detecting message through the step (A) and (G) is based on WAVE communication standard of IEEE 802.11p.

* * * * *